UNITED STATES PATENT OFFICE 2,294,884

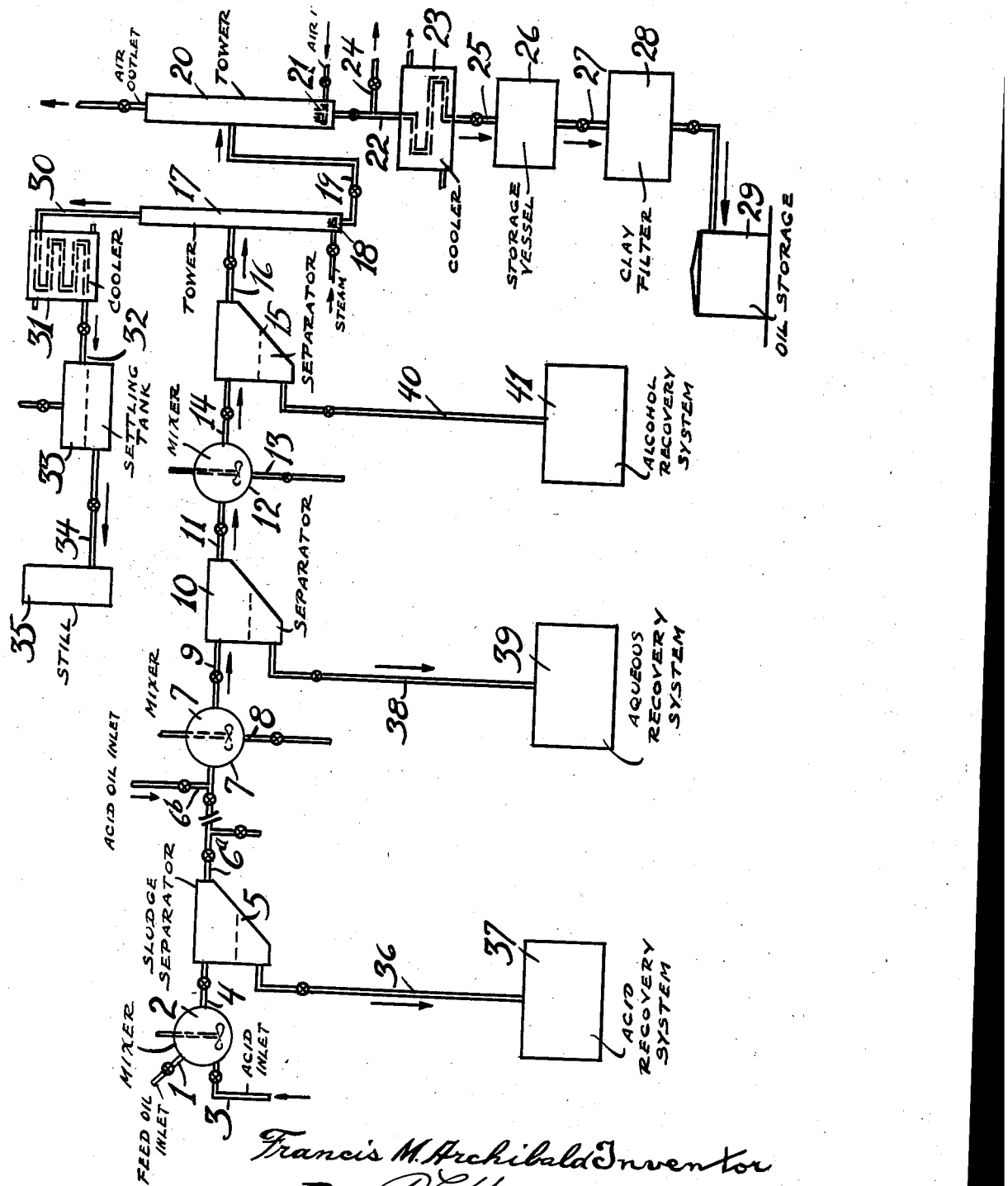

PROCESS FOR FINISHING MINERAL WHITE OILS

Francis M. Archibald, Elizabeth, N. J., assignor to Standard Oil Development Company, a corporation of Delaware Application December 30, 1939, Serial No. 311,907

4 Claims. (Cl. 196—40)

This invention relates to improvements in finishing of mineral white oil products especially in regard to the removal of objectionable odors and taste. The invention also relates to the preparation of mineral white oil products of improved stability.

In the preparation of white oil products from petroleum distillates of lubricating oil range for use as medicinal oils, turbine oils and technical oils, it has been customary in the past to neutralize exhaustively sulfuric acid treated oil with aqueous alcoholic alkali solution. By the term exhaustively sulfuric acid treated oil is meant oil which has been treated with from 20 to 55% of its volume with sulfuric acid varying in strength from 96% to 30% fuming acid. After washing the neutralized oil with an aqueous alcohol such as of ethyl or isopropyl alcohol, the oil contains small quantities of oil soluble sulfonates and small quantities of alcohol. The oil is then usually blown with steam or air to remove the alcohol and volatile breakdown products. The treatment with steam usually takes between 8 and 10 hours at temperatures between 120° and 140° C. to produce an oil of acceptable odor and taste, the extent of treatment being determined largely by tasting the oil. The oil is then cooled and allowed to settle in order to permit the separation of small quantities of water formed by cooling and precipitation of dissolved moisture.

It has now been found that an improved white oil can be prepared by subjecting the alcohol-treated oil to treatment with steam and a stripping gas such as air, nitrogen, etc., for a very short time. In the present invention the oil after neutralization and alcohol washing is first treated with steam at temperatures between 140° C. and 190° C. The oil is then air blown at temperatures between 90° and 125° C. This treatment of the oil with steam and air is effected in a relatively short period of time, usually less than 10 minutes. The oil after the air treatment is then rapidly cooled and if necessary clay treated.

The process of the present invention is preferably carried out in two packed columns operated at about atmospheric pressure through which preheated oil is passed. In the first column the oil is blown with steam and in the second column the steam treated oil is blown with air. The columns are preferably packed with Raschig rings but the bubble type or plate type columns may also be used to advantage. The temperature in the first tower is preferably between about 145° C. and the steam passes into the tower at pressure between 100 and 125 pounds pressure. The amount of steam employed in the tower is between 1 and 4 lbs. per gallon of oil and preferably between 1.45 and 3 pounds per gallon of oil. The quantity of steam employed is however determined largely by the viscosity of the oil and by the flavor or taste specification on the oil to be met. The amount of air employed in the second tower is sufficient to remove all traces of moisture from the oil in order to obviate a settling process for the removal of water at a subsequent stage. The amount of air usually employed is between 15 and 95 cu. ft. per gallon of oil and preferably 80 cu. ft. of air per gallon of oil. The tower is operated at a temperature between 90° and 125° C. Time of treatment is about ten minutes and preferably slightly less than ten minutes.

The process of the present invention has the advantage over previous methods in the employment of a shorter period of contact time with steam and air. This short time of contact permits employment of relatively higher temperatures than have been employed in the past without the occurrence of considerable breakdown in the oil and the consequent instability of the treated product. This advantage is also evident from the improved appearance of the oil after the steam and air treatments. In the steam treatment of white oil products after alcohol washing three phases are usually observable: (1) the removal of alcohol, (2) the elimination of rancid smelling materials largely associated with the presence of water and (3) the passing off of a light oily material together with the steam as indicated by a slight peppermint odor. In the present process the rancid smelling compounds are rapidly removed together with the alcohol and the finished air-blown oil has a satisfactory flavor and odor.

As previously stated the use of packed towers in which small hold-up of material occurs is particularly advantageous. Another advantage of the process is the facility of operating on a continuous basis thereby permitting better control of quality of the products, reduced labor costs, and the use of relatively compact equipment.

The products obtained by the process of this invention also have other superior features over the products prepared according to the processes previously employed. Due to the appreciably lower moisture content of the oil the product obtained by the present process gives better clay filter yields; the quality of the oil is more uniform and is more stable especially as to oxidation and the development of corrosive characteristics. It appears that the improved stability of the product is largely the result of retaining in the oil many of the natural inhibitors which are either removed or destroyed in the processes at present largely used.

An illustration of the invention is the following description. The reference numerals in the description relate to the accompanying diagram of a suitable layout of equipment for carrying out the applicants' invention. Through line 1 a Mid-Continent lubricating oil distillate of 50 seconds Saybolt Universal at 100° F. was passed into a mixer 2 at the rate of 520 gallons per hour. In the mixer 2 the oil stream was treated with 20% of fuming sulfuric acid passed through line 3. The mixture was passed by line 4 to the sludge separator 5. The desludged oil was then passed through the line 6a to such additional mixers and separators similar to 2 and 5 as may be necessary to complete the acid treatment of the oil as determined by suitable plant tests. The acid oil was then passed through 6b to a mixer 7 into which was also passed through 8 a stream of 50-50 water-isopropyl alcohol solution containing about 10% sodium carbonate in an amount slightly in excess of that required to neutralize the oil entering through the line 6b. The mixture was passed through line 9 to the separator 10 wherein the treated oil separated from the aqueous solution. The upper oil layer was passed through line 11 to a mixer 12 to which was also supplied through line 13 a 50-50 water-isopropyl alcohol mixture in an amount of 20% by volume of the oil. The mixture was then passed through line 14 to a separator 15 wherein the oil separated from the aqueous alcohol solution. The upper oil layer was then passed through line 16 to a tower 17. The tower 17 was 1 ft. 9 in. in diameter, 20 ft. in height and was packed with 1 in. Raschig rings. The tower was maintained at an average temperature of 145° C. From the bottom of the tower 17 steam at about 120 pounds pressure per square inch was passed upwards from the manifold sprayer 18 in an amount of between 1,000 and 2,800 pounds per hour. The oil passed down the tower 17 and out by the line 19 to the tower 20. The temperature of the oil entering the tower 20 was 145° C. From the base of the tower 20 air at the rate of 100 cu. ft. per hour was passed upwards from the manifold sprayer 21. The air treated oil at a temperature of about 120° C. was passed by line 22 to the cooler 23. At a T 24 in the line 22 the oil was sampled and tasted for color. The oil, after cooling to about 60° C., was passed by line 25 to the storage vessel 26 and then by the line 27 to the clay filters 28. The clay treated oil was then passed by line 29 in storage. The exhaust 30 from the tower 17 was connected to the condenser 31. By the line 32 at the base of the condenser a mixture of oil, water and alcohol was passed to the settling tank 33. In the tank 33 a diphase separation occurred; the lower layer consisting of a liquid containing 5 to 10% alcohol was separated and passed by a line 34 to the still 35 to recover the alcohol which was condensed and passed to storage. The upper oil layer in the tank 33 was discarded. The exhaust from the tower 20 was vented to the air. The sludge from the separator 5 was passed from the line 36 to an acid recovery system 37. The lower aqueous layer from the separator 10 was passed by line 38 to the recovery system 39. The lower layer from the separator 15 was passed by line 40 to the alcohol recovery system 41.

The nature and objects of the invention having been described and practical embodiments of same having been given without any intention of thereby defining the scope of the invention, what is claimed is:

1. A process for preparing mineral white oils which comprises exhaustively treating petroleum stocks of lubricating oil consistency with concentrated sulfuric acid, separating the resulting heavy sludge from the oil layer, neutralizing and washing the oil with an aqueous alcoholic alkali solution, separating the aqueous alcoholic layer, then treating countercurrently the resultant oil with steam at a temperature between 140° C. and 190° C. and then with air countercurrently at a temperature between 90° C. and 125° C., the contact time of the oil with the steam and air not exceeding 10 minutes, cooling the oil rapidly and then treating with clay.

2. A process for preparing mineral white oils which comprises exhaustively treating petroleum stocks of lubricating oil consistency with concentrated sulfuric acid, separating the resulting heavy sludge from the oil layer, neutralizing the oil with an aqueous alcoholic alkali solution, separating the aqueous alcoholic layer, then washing the oil with an aqueous alcohol solution, separating the aqueous alcoholic layer, treating the resultant oil with steam countercurrently in a packed column at a temperature between 140° C. and 190° C., and then with air countercurrently in a packed column at a temperature between 90° C. and 125° C., the contact time of the oil with the steam and air not exceeding 10 minutes, cooling the oil rapidly and then treating with clay.

3. A process for preparing mineral white oils which comprises exhaustively treating petroleum stocks of lubricating oil consistency with concentrated sulfuric acid, separating the resulting heavy sludge from the oil layer, neutralizing the oil with an aqueous alcoholic alkali solution, separating the aqueous alcoholic layer, then washing the oil with an aqueous alcohol solution, separating the aqueous alcoholic layer, treating the resultant oil countercurrently in a packed column at a temperature between 140° C. and 190° C. with an amount of steam between 1 and 4 lbs./gal. of oil and then countercurrently in a packed column with air at the rate of 100 cu. ft./hr. at a temperature between 90° C. and 125° C. the contact time of the oil with the steam and air not exceeding 10 minutes, cooling the oil rapidly to 60° C. and then treating with clay.

4. A process for preparing mineral white oils which comprises exhaustively treating petroleum stocks of lubricating oil consistency with concentrated sulfuric acid, separating the resulting heavy sludge from the oil layer, neutralizing the oil with an aqueous alcoholic alkali solution, separating the aqueous alcoholic layer, then washing the oil with an aqueous alcohol solution, separating the aqueous alcoholic layer, treating the resultant oil over a period of about 10 minutes first rapidly with steam at a temperature between 140° C. and 190° C. to remove rancid smelling compounds and then with air at a temperature between 90° C. and 125° C. to eliminate moisture, and then cooling the oil rapidly.

FRANCIS M. ARCHIBALD.